United States Patent
Xie et al.

(10) Patent No.: US 10,666,144 B1
(45) Date of Patent: May 26, 2020

(54) BOOST CONVERTER

(71) Applicant: TEXAS INSTRUMENTS INCORPORATED, Dallas, TX (US)

(72) Inventors: Linghan Xie, Wuxi (CN); Jianzhang Xie, Shanghai (CN); Wei Zhao, Shanghai (CN); Weicheng Zhang, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/449,659

(22) Filed: Jun. 24, 2019

Related U.S. Application Data (60) Provisional application No. 62/827,602, filed on Apr. 1, 2019.

(51) Int. Cl.
| | |
|---|---|
| *H02M 3/158* | (2006.01) |
| *H02M 3/335* | (2006.01) |
| *G05F 1/10* | (2006.01) |
| *H02M 1/38* | (2007.01) |
| *H02M 1/00* | (2006.01) |

(52) U.S. Cl.
CPC ............ *H02M 3/1582* (2013.01); *G05F 1/10* (2013.01); *H02M 1/38* (2013.01); *H02M 3/33507* (2013.01); *H02M 2001/0003* (2013.01)

(58) Field of Classification Search
CPC ........ H02M 1/38; H02M 3/156; H02M 3/157; H02M 1/158; H02M 1/1582; H02M 3/335; H02M 3/33507; H02M 2001/0003
See application file for complete search history.

(56) References Cited

U.S. PATENT DOCUMENTS

| | | | |
|---|---|---|---|
| 8,222,882 B2* | 7/2012 | Balakrishnan .... | H02M 3/33507 323/283 |
| 9,455,627 B2* | 9/2016 | Imayoshi ............. | H02M 3/156 |
| 9,647,541 B2 | 5/2017 | Fan | |
| 2015/0244269 A1* | 8/2015 | Yu ........................ | H02M 3/156 323/284 |
| 2017/0117805 A1* | 4/2017 | Hane ...................... | H02M 1/08 |

* cited by examiner

*Primary Examiner* — Matthew V Nguyen
(74) *Attorney, Agent, or Firm* — Mark Allen Valetti; Charles A. Brill; Frank D. Cimino (57) ABSTRACT

A DC-DC converter controller includes a transistor driver, a flip-flop, a comparator, an integrator circuit, a switch, and a pulse generator circuit. The flip-flop includes an output coupled to an input of the transistor driver. The comparator includes an output coupled an input of the flip-flop. The integrator circuit includes an output coupled to an input of the comparator. The switch includes a first terminal coupled to the output of the integrator circuit, and a second terminal coupled to ground. The pulse generator circuit includes an input coupled to an output of the transistor driver, and an output coupled to a third terminal of the switch.

20 Claims, 6 Drawing Sheets

BOOST CONVERTER

CROSS-REFERENCE TO RELATED APPLICATIONS

The present application claims priority to U.S. Provisional Patent Application No. 62/827,602, filed Apr. 1, 2019, entitled "Boost Converter with Quasi Fixed Frequency," which is hereby incorporated herein by reference in its entirety.

BACKGROUND

A switch-mode power supply is an electronic circuit that converts an input direct current (DC) supply voltage into one or more DC output voltages that are higher or lower in magnitude than the input DC supply voltage. A switch-mode power supply that generates an output voltage lower than the input voltage is termed a buck or step-down converter. A switch-mode power supply that generates an output voltage higher than the input voltage is termed a boost or step-up converter.

Some switch-mode power supply topologies include a drive/power transistor coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. Switch-mode power supplies are widely used in electronic devices, particularly battery powered devices, such as portable cellular phones, laptop computers, and other electronic systems in which efficient use of power is desirable.

SUMMARY

A DC-DC converter and controller for the same that reduce the variation in converter switching frequency are disclosed herein. In one example, a DC-DC converter controller includes a transistor driver, a flip-flop, a comparator, an integrator circuit, a switch, and a pulse generator circuit. The flip-flop includes an output coupled to an input of the transistor driver. The comparator includes an output coupled an input of the flip-flop. The integrator circuit includes an output coupled to an input of the comparator. The switch includes a first terminal coupled to the output of the integrator circuit, and a second terminal coupled to ground. The pulse generator circuit includes an input coupled to an output of the transistor driver, and an output coupled to a third terminal of the switch.

In another example, a DC-DC converter controller includes a transistor driver, a flip-flop, a comparator, an amplifier; and a sample and hold circuit. The flip-flop includes an output coupled to an input of the transistor driver. The comparator includes an output coupled an input of the flip-flop. The amplifier includes an output coupled to an input of the comparator. The sample and hold circuit includes a first input coupled to an input of the comparator, a second input coupled to an output of the transistor driver, and an output coupled to an input of the amplifier.

In another example, a DC-DC converter, includes an inductor, a transistor, a transistor driver, a flip-flop, a comparator, an integrator circuit, a switch, and a pulse generator circuit. The transistor includes a first terminal coupled to the inductor. The transistor driver includes an output coupled to a second terminal of the transistor. The flip-flop includes an output coupled to an input of the transistor driver. The comparator includes an output coupled to an input of the flip-flop. The integrator circuit includes an output coupled to an input of the comparator. The switch includes a first terminal coupled to the output of the integrator circuit, and a second terminal coupled to ground. The pulse generator circuit includes an input coupled to the output of the transistor driver, and an output coupled to a third terminal of the switch.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

Accurate switching frequency ($F_{SW}$) is one figure of merit for DC/DC converters. The fixed-frequency architecture provides one solution to achieving accurate $F_{SW}$, but introduces sub-harmonic oscillation that is solved by slope compensation, which adds cost, design effort, and reduced inductor range.

A control system with adaptive constant on or off time ($t_{on}$ or $t_{off}$) does not introduce sub-harmonic oscillation, features a simple control loop architecture and fast transient response, and allows for a wide inductor selection range. Therefore, constant on or off time architectures are widely implemented.

Figure 1:
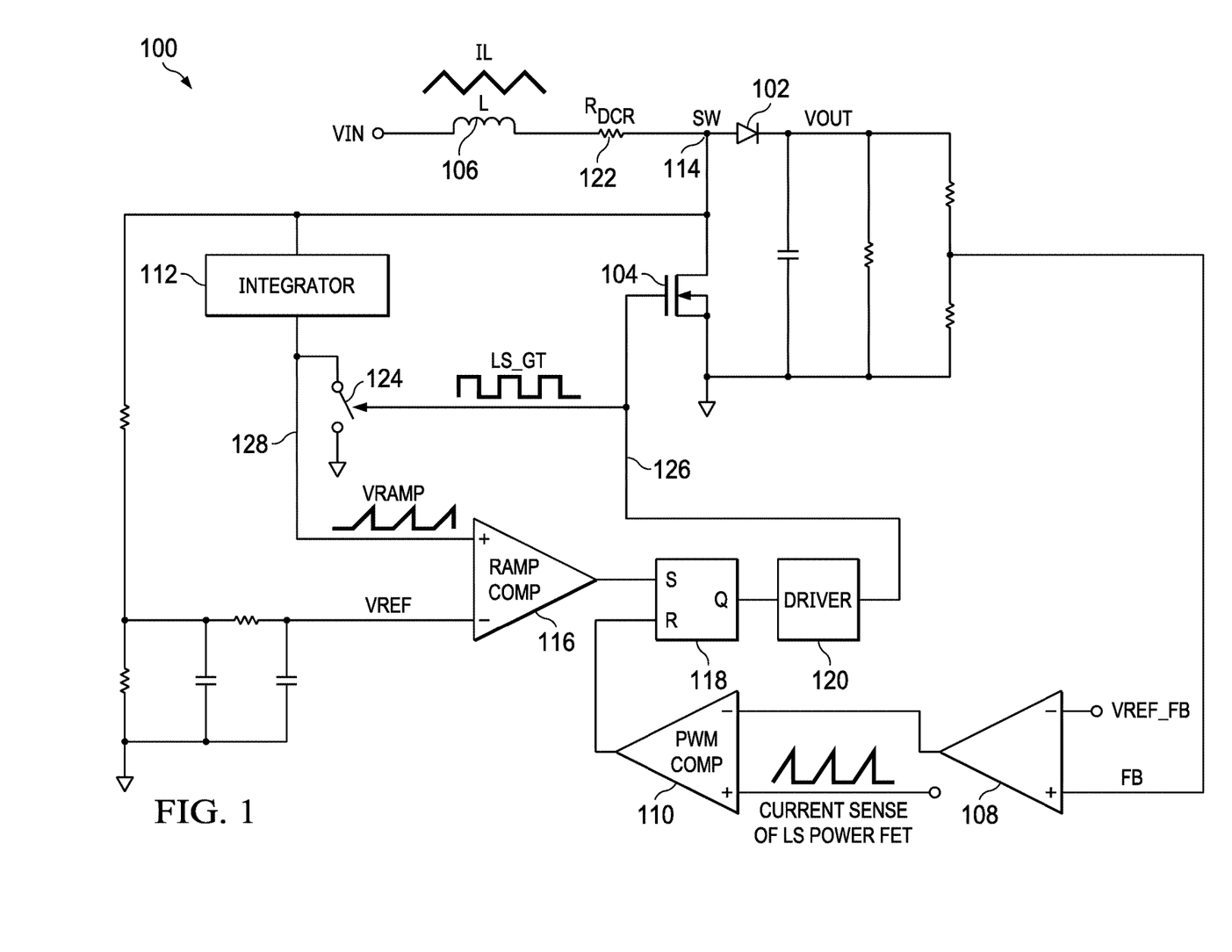
FIG. 1 shows an example constant off time boost converter.
Figure 2:
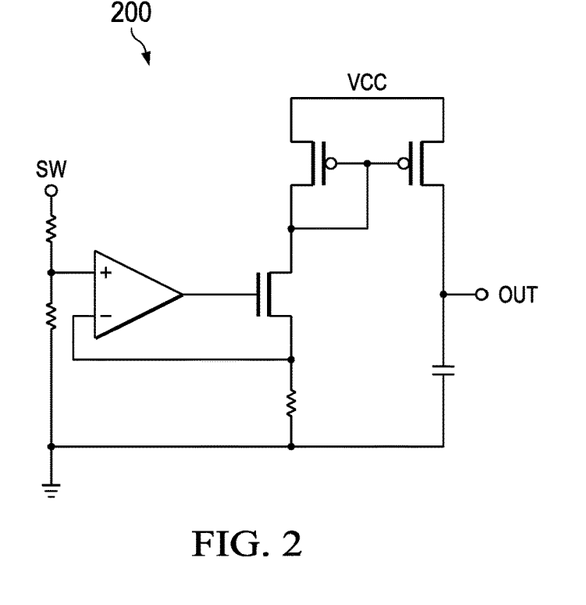
FIG. 2 shows an example integrator circuit suitable for use in the constant off time boost converter of FIG. 1.

FIG. 1 shows an example constant off time boost converter 100. A DC/DC converter usually includes a high side power field effect transistor (FET) or a high side diode (in boost converters), and a low side power FET. The constant off time boost converter 100 includes high side diode 102 and low side power FET 104. In the constant off time boost converter 100, at the beginning of each switching cycle, the low side power FET 104 is turned on, until the current ($I_L$) in the inductor 106 increases up to a peak current determined by the output of error amplifier 108. When the peak current is reached, the pulse width modulator (PWM) comparator 110 trips, and turns off the low side power FET 104. While the low side power FET 104 is off, the current in the inductor 106 gradually decreases and the integrator circuit 112 integrates the voltage $V_{SW}$ 114. FIG. 2 shows an example integrator circuit 200. The integrator circuit 200 is suitable for use as the integrator circuit 112. When the output ($V_{RAMP}$) of the integrator circuit 112 increases to a reference voltage ($V_{REF}$), the comparator 116 changes state to end the off-time and turn on the low side power FET 104. The off-time of the low side power FET 104 is proportional to the ratio of $V_{IN}$ to $V_{OUT}$ to achieve approximate constant switching frequency.

The constant off time boost converter 100, and similar DC-DC converters with adaptive constant on or off time have non-trivial $F_{SW}$ variation caused by the on resistance ($R_{on\_LS}$) of the low side power FET 104 and delay of the comparator 116, the flip-flop 118, and the driver 120. Large variation of frequency in the constant off time boost converter 100, and similar circuits, is not acceptable in some applications (e.g., automotive and industrial applications). The DC-DC converters and DC-DC converter controllers disclosed herein reduce the variation of $F_{SW}$.

For a boost converter, according to the 'Volt-Seconds' principle, if the DC resistance ($R_{DCR}$ 122) of the inductor (e.g., the inductor 106) is zero, the following equations can be obtained when the convertor is in steady state.

$$\int_0^{t_{on}} \frac{V_{IN} - V_{SW}(t)}{L} dt = \int_{t_{on}}^{t_{on}+t_{off}} \frac{V_{SW}(t) - V_{IN}}{L} dt \quad (1)$$

$$\int_0^{t_{on}} V_{IN} dt + \int_{t_{on}}^{t_{on}+t_{off}} V_{IN} dt = \int_0^{t_{on}} V_{SW}(t) dt + \int_{t_{on}}^{t_{on}+t_{off}} V_{SW}(t) dt \quad (2)$$

$$V_{IN}(t_{on} + t_{off}) = \int_0^{t_{on}} V_{SW}(t) dt + \int_{t_{on}}^{t_{on}+t_{off}} V_{SW}(t) dt \quad (3)$$

The period time T is:

$$T = t_{on} + t_{off} \quad (4)$$

Applying equation (4) to equation (3) produces the following equations:

$$V_{IN} T = \int_0^{t_{on}} V_{SW}(t) dt + \int_{t_{on}}^{t_{on}+t_{off}} V_{SW}(t) dt \quad (5)$$

$$V_{IN} T = \int_0^T V_{SW}(t) dt \quad (6)$$

The threshold $V_{REF}$ of the RAMP comparator (e.g., comparator 116) may be set to be proportional $KV_{IN}$, such that:

$$\frac{1}{RC} \int_0^T V_{SW}(t) dt = KV_{IN} \quad (7)$$

$$K = \frac{R_2}{R_1 + R_2} \quad (8)$$

$$R = \frac{(R_3 + R_4) R_5}{R_3} \quad (9)$$

According to equations (6) and (7), an accurate time period T can be obtained as:

$$V_{IN} T = RCK V_{IN} \quad (10)$$

$$T = RCK \quad (11)$$

In practice, the inductor does include resistance $R_{DCR}$, and because of the voltage drop across $R_{DCR}$, $V_{IN} T$ does not exactly equal $$\int_0^T V_{SW}(t) dt.$$

However, equation (12) below is correct when the converter is operating in steady state.

$$\frac{\int_0^T V_{SW}(t) dt}{T} = \overline{V_{SW}} \quad (12)$$

where $\overline{V_{SW}}$ is the average of voltage $V_{SW}$ 114.

Setting:

$$\frac{1}{RC} \int_0^T V_{SW}(t) dt = K \overline{V_{SW}}, \quad (13)$$

and inserting equation (12) into equation (13), $$T = RCK \quad (14)$$

However, in the constant off time boost converter 100, and similar DC-DC converters, the switch 124 is controlled by the gate drive signal 126, and integration is only performed when the low side power FET 104 is off. That is, the constant off time boost converter 100 assumes:

$$\frac{1}{RC} \int_{t_{on}}^{t_{on}+t_{off}} V_{SW}(t) dt = K \overline{V_{SW}} \quad (15)$$

Figure 3:
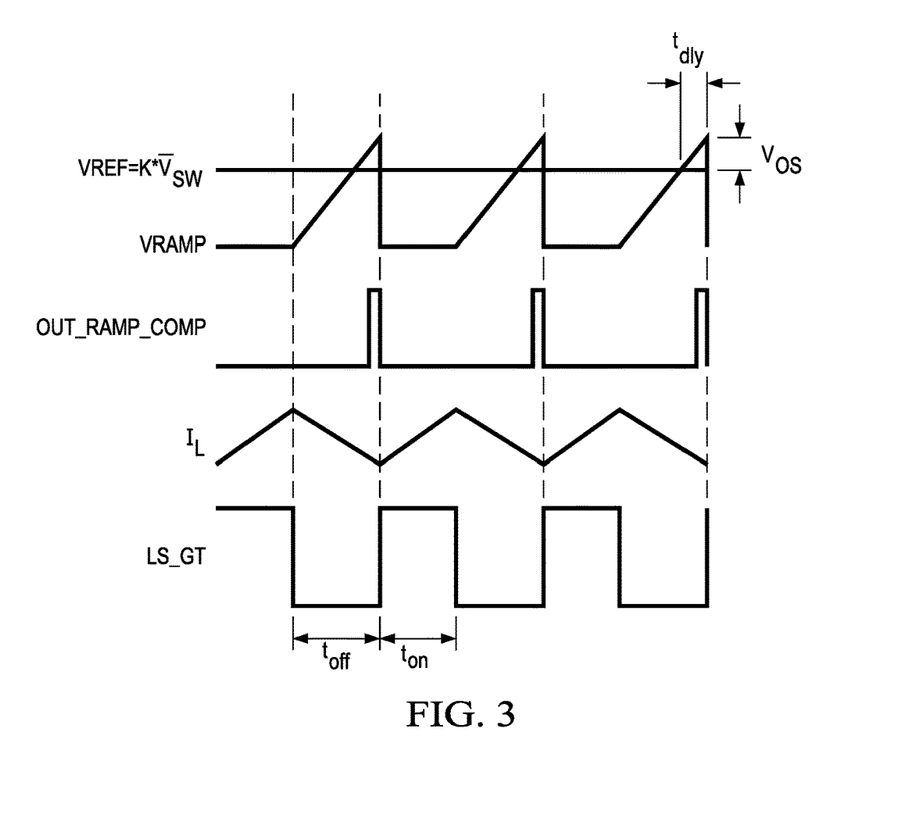
FIG. 3 shows signals generated during operation of the constant off time boost converter of FIG. 1.

Therefore, in the constant off time boost converter 100, and similar converters, the influence of the on resistance of the low side power FET 104 on $V_{SW}$ while the low side power FET 104 is turned on is ignored. Moreover, as noted above, the delay of the comparator 116, the flip-flop 118, and the driver 120 affect the accuracy of the switching frequency. FIG. 3 shows that the integrator output 128 ($V_{RAMP}$) exceeds the reference voltage ($V_{REF}$) by an offset ($V_{OS}$) in each cycle because of delay $t_{dly}$ in turning on the low side power FET 104 caused by delay in the comparator 116, the flip-flop 118, and the driver 120.

For the constant off time boost converter 100, in practice:

$$\int_{t_{on}}^{t_{on}+t_{off}} V_{SW}(t) dt = RCK \overline{V_{SW}} + V_{OS} \quad (16)$$

$$\int_0^{t_{on}} V_{SW}(t) dt + \int_{t_{on}}^{t_{on}+t_{off}} V_{SW}(t) dt = RCK \overline{V_{SW}} + V_{OS} + \int_0^{t_{on}} V_{SW}(t) dt \quad (17)$$

$$\int_0^T V_{SW}(t) dt = RCK \overline{V_{SW}} + V_{OS} + \int_0^{t_{on}} V_{SW}(t) dt$$

According to equation (12):

$$T \overline{V_{SW}} = RCK \overline{V_{SW}} + V_{OS} + \int_0^{t_{on}} V_{SW}(t) dt \quad (18)$$

Thus, the period of T in the constant off time boost converter 100, and similar DC-DC converters, is:

$$T = KRC + \frac{V_{OS} + \int_0^{t_{on}} V_{SW}(t)dt}{\overline{V_{SW}}} \quad (19)$$

When the low side power FET 104 is turned on:

$$V_{SW} = R_{on\_LS} I_L, \text{ and} \quad (20)$$

because during the whole cycle, $$\overline{V_{SW}} = V_{IN} - R_{DCR} \overline{I_L}, \quad (21)$$

inserting equations (20) and (21) into equation (19) produces equation (22):

$$T = KRC + \frac{V_{OS} + \int_0^{t_{on}} R_{on\_LS} I_L(t) dt}{V_{IN} - R_{DCR} \overline{I_L}} \quad (22)$$

$$V_{OS} \approx \frac{V_{OUT} t_{dly}}{RC} \quad (23)$$

where $t_{dly}$ is the total delay caused by the comparator 116, the flip-flop 118, and the driver 120. According to equation (22), the period T varies when any of the on resistance ($R_{on}$) of the low side power FET 104, $V_{OS}$, $V_{IN}$, $t_{on}$, $R_{DCR}$, or $I_L$ changes.

The DC-DC converter controllers and DC-DC converters disclosed herein include a pulse generator that generates a short pulse at the beginning of each cycle (i.e., the beginning of turning on of the low side power FET), upon a rising edge of the gate drive signal that controls the low side power FET, which clears the output of the integrator. After the pulse, the integrator integrates the voltage $V_{SW}$ over the entire cycle. By including integration of voltage $V_{SW}$ while the low side power FET is on, according to equations 1-14, the DC-DC converter controllers and DC-DC converters disclosed herein reduce frequency variation caused by on resistance of the low side power FET.

The DC-DC converter controllers and DC-DC converters disclosed herein also include a sample-and-hold circuit to sample $V_{RAMP}$ and hold an output thereof at the peak of $V_{RAMP}$. The peak of $V_{RAMP}$ is provided to a negative input terminal of an amplifier, which generates an output signal AMP_OUT based on a difference between a reference voltage $V_{REF}$ and the peak of $V_{RAMP}$. Due to the delay of the ramp comparator, and the FET driver, AMP_OUT is slightly lower than the peak of $V_{RAMP}$. The amplifier ensures the peak of $V_{RAMP}$ substantially equals $V_{REF}$, and provides dynamic adjustment of the gap between AMP_OUT and $V_{REF}$ based on the delay of the ramp comparator and the FET driver. Thus, the offset $V_{OS}$ between $V_{REF}$ and the peak $V_{RAMP}$ is reduced or eliminated, and the frequency variation caused by the delay of the ramp comparator and the FET driver is reduced or eliminated.

By implementing the pulse generator and the sample and hold circuit described above, the DC-DC converter controllers and DC-DC converters disclosed herein operate per equation (14), where the period T and frequency $F_{SW}$ are stable, regardless of variation of $R_{on\_LS}$, $V_{OS}$, $V_{IN}$, $t_{on}$ or $I_L$.

Figure 4:
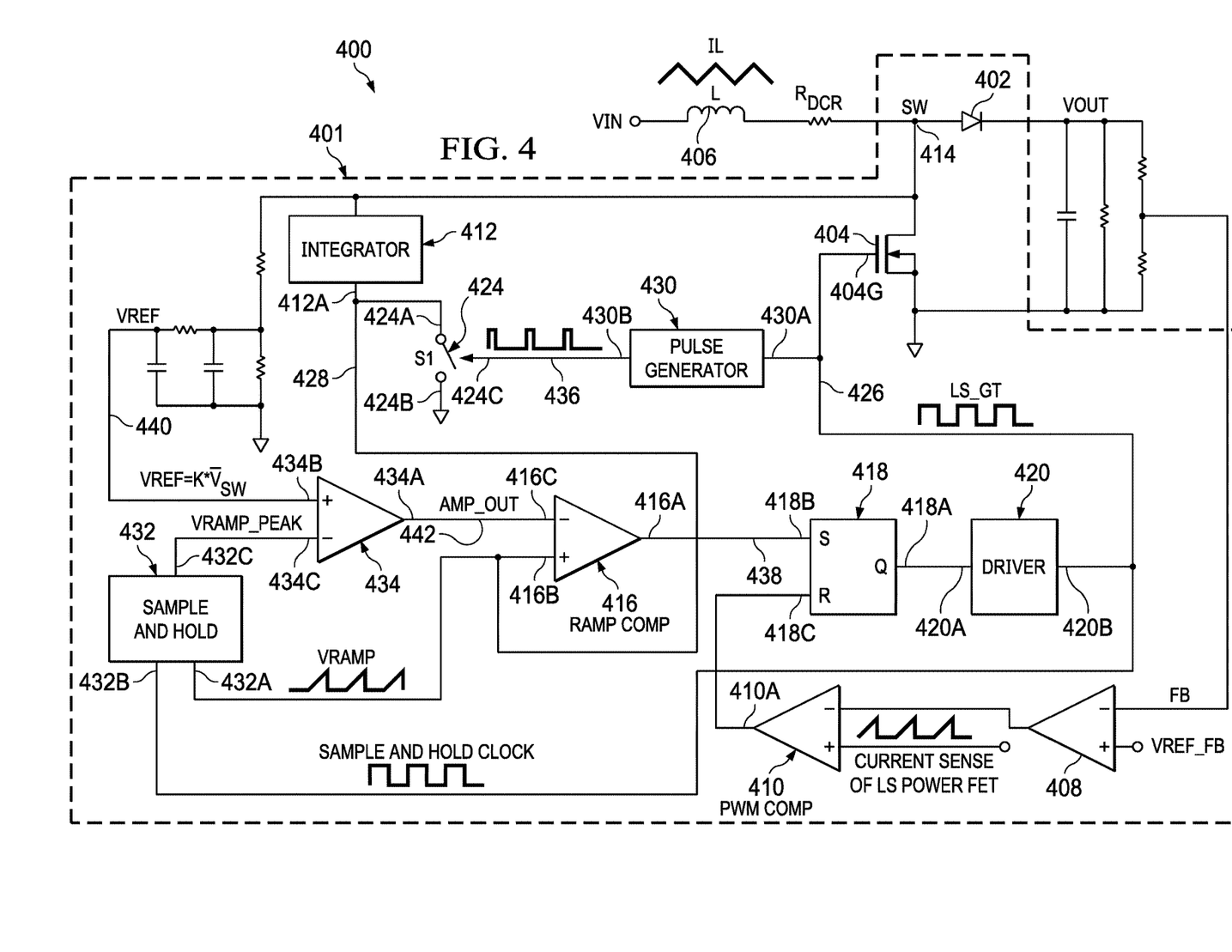
FIG. 4 shows an example constant off time boost controller with reduced frequency variation in accordance with the present disclosure.

FIG. 4 shows an example DC-DC converter 400 that includes a constant off time boost controller with reduced frequency variation in accordance with the present disclosure. The DC-DC converter 400 includes an inductor 406 and a DC-DC converter controller 401. The DC-DC converter controller 401 is coupled to the inductor 406. The DC-DC converter controller 401 includes a diode 402, a low side power FET 404, a transistor driver 420, a flip-flop 418, an amplifier 408, a comparator 410, an integrator circuit 412, a switch 424, a pulse generator circuit 430, a sample and hold circuit 432, an amplifier 434, and a comparator 416. The diode 402 is replaced by one or more transistors in some implementations of the DC-DC converter 400. The diode 402 and the low side power FET 404 are coupled to the inductor 406.

The transistor driver 420 controls (turns on and off) the low side power FET 404. The transistor driver 420 includes an output 420B that is coupled to a gate terminal 404G of the low side power FET 404. The flip-flop 418 toggles to generate the signal 426 driven to the low side power FET 404 by the transistor driver 420. The flip-flop 418 includes an output 418A coupled to an input 420A of the transistor driver 420. The flip-flop 418 includes a set input 418B and a reset input 418C. The reset input 418C is coupled to an output 410A of the comparator 410, and the set input 418B is coupled to an output 416A of the comparator 416. The comparator 410 turns off the low side power FET 404 to discharge the inductor 406, and the comparator 416 turns on the low side power FET 404 to charge the inductor 406.

The comparator 410 is coupled to the amplifier 408. The amplifier 408 generates an error signal as a difference of feedback voltage from the output of the DC-DC converter 400 and a reference voltage. The comparator 410 compares the error signal to a measurement of current in the low side power FET 404 to determine when to turn off the low side power FET 404.

The comparator 416 is coupled to the integrator circuit 412. Input 416B of the comparator 416 is coupled to output 412A of the integrator circuit 412. The integrator circuit 412 integrates the voltage $V_{SW}$ 414. The integrator circuit 200 may be applied to implement the integrator circuit 412. As further explained below, the integrator circuit 412, as controlled by the pulse generator 430, integrates the voltage $V_{SW}$ 414 over the entire conversion cycle to reduce errors in the frequency of the DC-DC converter 400 caused by the on resistance of the low side power FET 404.

The switch 424 is coupled to the integrator circuit 412. When the pulse signal 436 is active, the switch 424 is closed to reset the integrator circuit 412. A terminal 424A of the switch 424 is coupled to the output 412A of the integrator circuit 412, and a terminal 424B of the switch 424 is coupled to ground. To reduce errors in the frequency of the DC-DC converter 400 caused by the on resistance of the low side power FET 404, the pulse generator circuit 430 is coupled to the switch 424, and controls closing of the switch 424. Input 430A of the pulse generator circuit 430 is coupled to the output 420B of the transistor driver 420, and output 430B of the pulse generator circuit 430 is coupled to control terminal 424C of the switch 424. When the signal 426 is activated by the transistor driver 420 to turn on the low side power FET 404, the pulse generator circuit 430 generates the pulse signal 436 (at and responsive to the leading edge of the signal 426) to close the switch 424 and reset the integrator circuit 412. The pulse signal 436 may be 10-20 nanoseconds in width in some implementations of the pulse generator circuit 430. The pulse is a fraction of the period of the DC-DC converter 400 in width. Thus, the integrator circuit 412 is reset only for the duration of the pulse signal 436, and integrates the $V_{SW}$ 414 over the remaining duration of the period of the DC-DC converter 400 (i.e., while the low side power FET 404 is turned on and turned off). The pulse generator circuit 430 may be implemented as any circuit that generates a pulse responsive to a rising edge of an input signal.

The comparator 416 compares the $V_{RAMP}$ signal 428 generated by the integrator circuit 412 to output signal 442 of the amplifier 434. The output 434A of the amplifier 434 is coupled to input 416C of the comparator 416. The amplifier 434 generates a difference signal based on a reference voltage ($V_{REF}$) 440, received at input 434B of the amplifier 434, and an output signal of the sample and hold circuit 432. The reference voltage ($V_{REF}$) 440 is proportional to an average of the $V_{SW}$ 414.

The sample and hold circuit 432 captures the peak voltage of the $V_{RAMP}$ signal 428 generated by the integrator circuit 412. The sample and hold circuit 432 includes an input 432A coupled to the output 412A of the integrator circuit 412, an input 432B coupled to the output 420B of the transistor driver 420, and an output 432C coupled to the input 434C of the amplifier 434. The signal 426 generated by the transistor driver 420 controls the sample timing of the sample and hold circuit 432. For example, the sample and hold circuit 432 samples the $V_{RAMP}$ signal 428 when the low side power FET 404 is off, and holds the sampled voltage when the low side power FET 404 is on.

Peak voltage of the $V_{RAMP}$ signal 428, output by the sample and hold circuit 432, that exceeds the reference voltage ($V_{REF}$) 440 represents uncompensated delay of comparator 416, the flip-flop 418, and the transistor driver 420. The amplifier 434 generates an output signal 442 for comparison to the $V_{RAMP}$ signal 428 that compensates for the delay to ensure that the peak voltage of the $V_{RAMP}$ signal 428 substantially equals the reference voltage ($V_{REF}$) 440.

Figure 5:
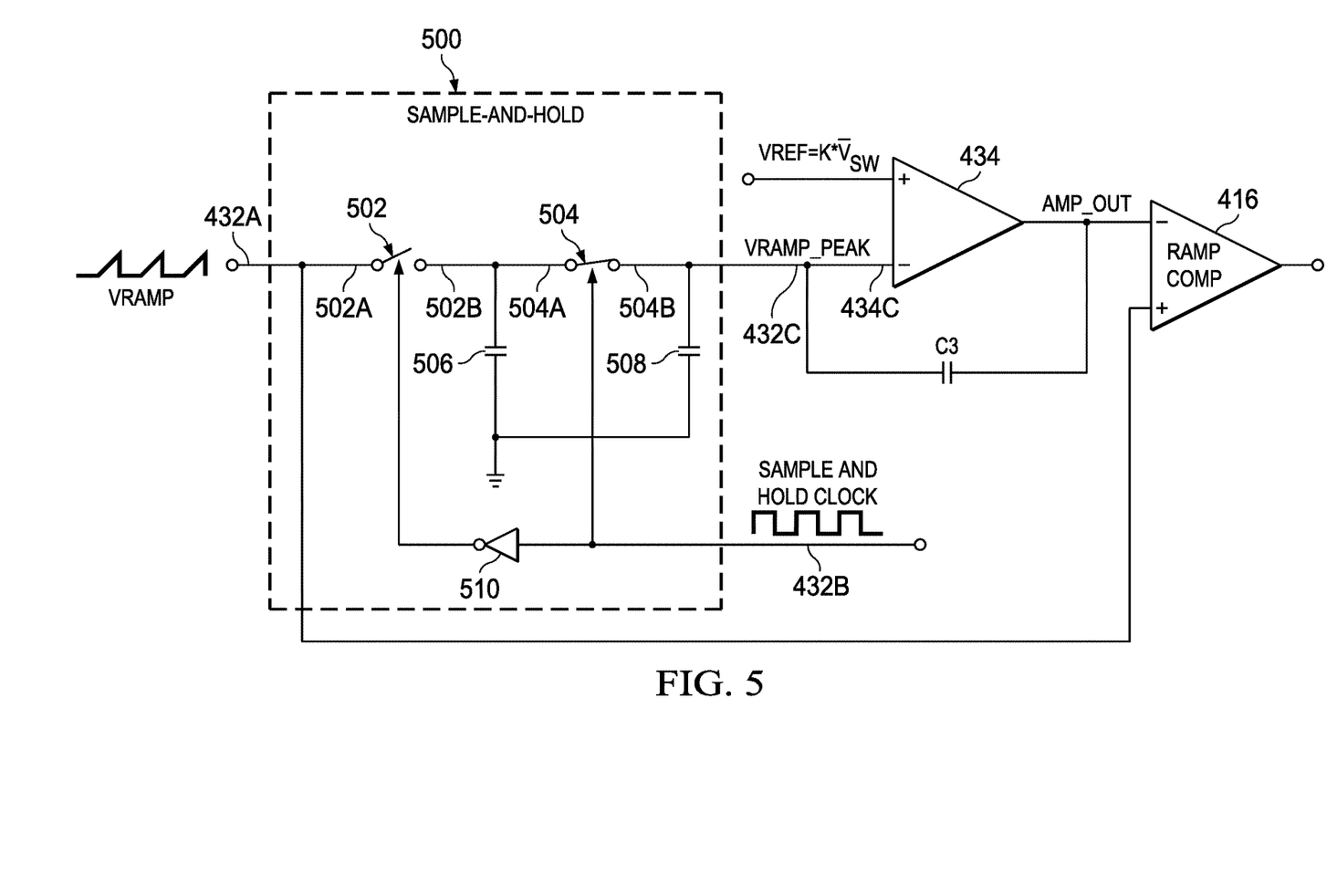
FIG. 5 shows a sample and hold circuit suitable for use in the constant off time boost converter of FIG. 4.

FIG. 5 shows an example sample and hold circuit 500. The sample and hold circuit 500 is an implementation of the sample and hold circuit 432. The comparator 416 and the amplifier 434, while not part of the sample and hold circuit 500, are shown in FIG. 5 for context. The sample and hold circuit 500 includes a switch 502, a switch 504, a capacitor 506, a capacitor 508, and an inverter 510. The switch 502 includes a terminal 502A that is coupled the output 412A of the integrator circuit 412 to receive the $V_{RAMP}$ signal 428, and a terminal 502B that is coupled to terminal 504A of the switch 504. The capacitor 506 is coupled to the terminal 502B of the switch 502 and the terminal 504A of the switch 504. The capacitor 508 is coupled to the terminal 504B of the switch 504. The terminal 504B of the switch 504 is coupled the input 434C of the amplifier 434. The switch 502 is controlled by output of the inverter 510, and the switch 504 is controlled by input to the inverter 510, such that the switch 502 and the switch 504 are complementarily opened and closed. The input of the inverter 510 is coupled to the output 420B of the transistor driver 420.

Figure 6:
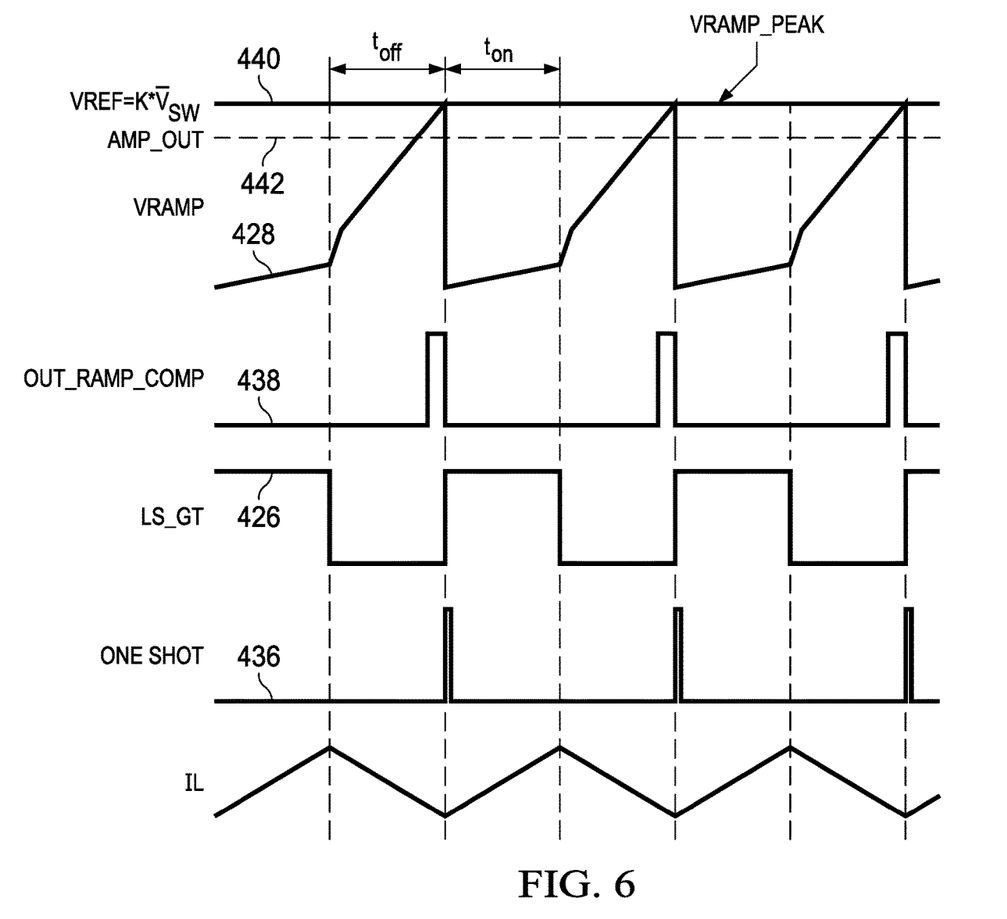
FIG. 6 shows signals generated during operation of the constant off time boost converter of FIG. 4.

FIG. 6 shows signals generated during operation of the DC-DC converter 400. In each cycle, integration begins at the falling edge of the pulse signal 436. Thus, while the low side power FET 404 is on, $V_{RAMP}$ signal 428 rises. In contrast, FIG. 3 shows in the constant off time boost converter 100, the $V_{RAMP}$ signal remains at zero while the low side power FET 104 is on. Referring again to FIG. 6, due to the delay caused by comparator 416, the flip-flop 418, and the transistor driver 420 the peak of the $V_{RAMP}$ signal 428 is slightly greater than the output signal 442 generated by the amplifier 434. The negative feedback loop including the sample and hold circuit 432, the amplifier 434, and the comparator 416 ensures that the peak of the $V_{RAMP}$ signal 428 substantially equals the reference voltage ($V_{REF}$) 440 during operation as shown in FIG. 6.

Thus, when the input voltage and load current are stable, the DC-DC converter 400 reduces variation in operating frequency with respect to different values of input voltage, output voltage and load current. However, because the DC-DC converter 400 is a constant off time converter, when the input voltage or load current changes abruptly, the operating frequency of the DC-DC converter 400 will vary, which helps reduce overshoot and undershoot of the output voltage.

Figure 7:
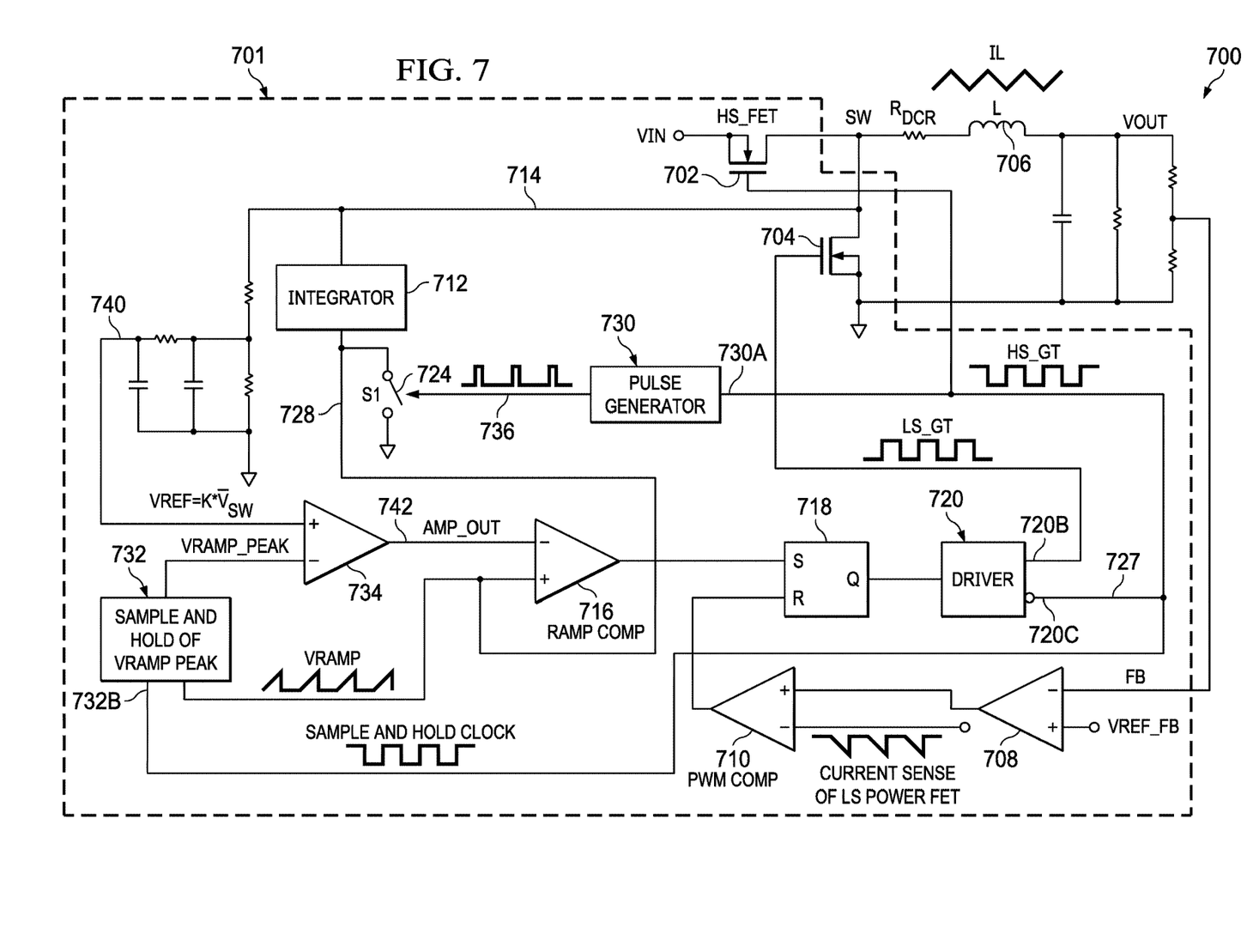
FIG. 7 shows an example constant on time buck controller with reduced frequency variation in accordance with the present disclosure.

FIG. 7 shows an example constant on time buck converter 700 with reduced frequency variation in accordance with the present disclosure. The constant on time buck converter 700 includes an inductor 706 and a DC-DC converter controller 701. The DC-DC converter controller 701 includes a high side power FET, a low side power FET 704, a transistor driver 720, a flip-flop 718, an amplifier 708, a comparator 710, an integrator circuit 712, a pulse generator circuit 730, a sample and hold circuit 732, an amplifier 734, and a comparator 716. The sample and hold circuit 732 may be an implementation of the sample and hold circuit 500. The constant on time buck converter 700 differs from the DC-DC converter 400, which is a boost converter, in that the high side power FET 702, and connection of the high side power FET 702 and low side power FET 704 to the inductor 706 differ from diode 402 and connections of the DC-DC converter 400 to provide buck rather than boost functionality.

The transistor driver 720, the flip-flop 718, the amplifier 708, the comparator 710, the integrator circuit 712, the pulse generator circuit 730, the sample and hold circuit 732, the amplifier 734, and the comparator 716 generally operate as respectively described for the transistor driver 420, the flip-flop 418, the amplifier 408, the comparator 410, the integrator circuit 412, the pulse generator circuit 430, the sample and hold circuit 432, the amplifier 434, and the comparator 416 of the DC-DC converter 400. The transistor driver 720 includes complementary outputs 720B and 720C. The output 720B is coupled to the low side power FET 704, and the output 720C is coupled to the high side power FET 702, the input 730A of the pulse generator circuit 730, and the input 732B of the sample and hold circuit 732. The transistor driver 720 turns on the high side power FET 702 (and turns off the low side power FET 704) to charge the inductor 706, and turns on the low side power FET 704 (and turns off the high side power FET 702) to discharge the inductor 706.

The amplifier 708 generates an error signal as a difference of feedback voltage from the output of the constant on time buck converter 700 and a reference voltage. The comparator 710 compares the error signal to a measurement of current in the low side power FET 704 to determine when to turn on the high side power FET 702.

The transistor driver 720 turns off the high side power FET 702 when the ramp comparator 716 determines that the $V_{RAMP}$ signal 728 has reached AMP_OUT 742. The pulse generator circuit 730 generates a pulse signal 736 upon a falling edge of the gate drive signal 727 that controls the high side power FET 702 (i.e., when the high side power FET 702 is turned off). The pulse signal 736 is relatively narrow (e.g., 10-20 nanoseconds), which allows the integrator 712 to integrate the voltage $V_{SW}$ 714 over the entire conversion cycle and reduce frequency variation caused by on resistance of the low side power FET 704.

The sample and hold circuit 732 samples the $V_{RAMP}$ signal 728 when the high side power FET 702 is on, and holds the output thereof at the peak of the $V_{RAMP}$ signal 728 when the high side power FET 702 is off. The comparator 716 compares the $V_{RAMP}$ signal 728 generated by the integrator circuit 712 to output signal 742 of the amplifier 434. The amplifier 734 generates a difference signal based on a reference voltage ($V_{REF}$) 740, received and an output signal of the sample and hold circuit 732. The reference voltage ($V_{REF}$) 740 is proportional to an average of the $V_{SW}$ 714. The signal 742 generated by the amplifier 743 compensates for delay of the comparator 716, the flip-flop 718, and the transistor driver 720 to ensure that the peak voltage of the $V_{RAMP}$ signal 728 substantially equals the reference voltage ($V_{REF}$) 740.

Modifications are possible in the described embodiments, and other embodiments are possible, within the scope of the claims.

What is claimed is:

1. A DC-DC converter controller, comprising:
    a transistor driver;
    a flip-flop comprising an output coupled to an input of the transistor driver;
    a comparator comprising an output coupled an input of the flip-flop;
    an integrator circuit comprising an output coupled to an input of the comparator;
    a switch comprising:
        a first terminal coupled to the output of the integrator circuit; and
        a second terminal coupled to ground; and
    a pulse generator circuit comprising:
        an input coupled to an output of the transistor driver; and
        an output coupled to a third terminal of the switch.

2. The DC-DC converter controller of claim 1, wherein:
    the comparator is a first comparator;
    the input of the flip-flop is a first input; and
    the DC-DC converter controller further comprises a second comparator comprising an output coupled to a second input of the flip-flop.

3. The DC-DC converter controller of claim 2, further comprising an amplifier comprising:
    an output coupled to an input of the second comparator; and
    an input coupled to an input of the integrator circuit.

4. The DC-DC converter controller of claim 3, wherein:
    the input of the amplifier is a first input; and
    the DC-DC converter controller further comprises a sample and hold circuit comprising:
        a first input coupled to the output of the integrator circuit;
        a second input coupled to the output of the transistor driver; and
        an output coupled to a second input of the amplifier.

5. The DC-DC converter controller of claim 4, wherein:
    the input of the second comparator is a first input; and
    the sample and hold circuit further comprises:
        a first switch comprising a first terminal coupled to a second input of the second comparator;
        a second switch comprising:
            a first terminal coupled to a second terminal of the first switch of the sample and hold circuit;
            a second terminal coupled to the second input of the amplifier;
        a first capacitor coupled to the first terminal of the second switch; and
        a second capacitor coupled to the second terminal of the second switch.

6. The DC-DC converter controller of claim 1, further comprising a transistor comprising:
    a first terminal coupled to the output of the transistor driver; and
    a second terminal coupled to an input of the integrator circuit.

7. The DC-DC converter controller of claim 1, wherein:
    the input of the comparator is a first input; and
    the DC-DC converter controller further comprises an amplifier comprising:
        an input coupled to an input of the integrator circuit; and
        an output coupled to a second input of the comparator.

8. A DC-DC converter controller, comprising:
    a transistor driver;
    a flip-flop comprising an output coupled to an input of the transistor driver;
    a comparator comprising an output coupled an input of the flip-flop;
    an amplifier comprising an output coupled to a first input of the comparator; and
    a sample and hold circuit comprising:
        a first input coupled to a second input of the comparator;
        a second input coupled to an output of the transistor driver; and
        an output coupled to an input of the amplifier.

9. The DC-DC converter controller of claim 8, wherein the sample and hold circuit further comprises:
    a first switch comprising a first terminal coupled to the second input of the comparator;
    a second switch comprising:
        a first terminal coupled to a second terminal of the first switch;
        a second terminal coupled to the input of the amplifier;
    a first capacitor coupled to the first terminal of the second switch; and
    a second capacitor coupled to the second terminal of the second switch.

10. The DC-DC converter controller of claim 8, wherein:
    the comparator is a first comparator;
    the amplifier is a first amplifier;
    the input of the flip-flop is a first input; and
    the DC-DC converter controller further comprises a second comparator comprising an output coupled to a second input of the flip-flop.

11. The DC-DC converter controller of claim 10, wherein:
    the amplifier is a first amplifier; and
    the DC-DC converter controller further comprises a second amplifier comprising an output coupled to an input of the second comparator.

12. The DC-DC converter controller of claim 8, further comprising an integrator circuit comprising an output coupled to an input of the comparator.

13. The DC-DC converter controller of claim 12, further comprising a transistor comprising:
    a first terminal coupled to the output of the transistor driver; and
    a second terminal coupled to an input of the integrator circuit.

14. The DC-DC converter controller of claim 12, further comprising:
    a switch comprising:
        a first terminal coupled to the output of the integrator circuit; and
        a second terminal coupled to ground; and a pulse generator circuit comprising:
  an input coupled to the output of the transistor driver; and
  an output coupled to a third terminal of the switch.

15. A DC-DC converter, comprising:
an inductor;
a transistor comprising a first terminal coupled to the inductor;
a transistor driver comprising an output coupled to a second terminal of the transistor;
a flip-flop comprising an output coupled to an input of the transistor driver;
a comparator comprising an output coupled an input of the flip-flop;
an integrator circuit comprising an output coupled to an input of the comparator;
a switch comprising:
  a first terminal coupled to the output of the integrator circuit; and
  a second terminal coupled to ground; and
a pulse generator circuit comprising:
  an input coupled to the output of the transistor driver; and
  an output coupled to a third terminal of the switch.

16. The DC-DC converter of claim 15, wherein:
the input of the comparator is a first input; and
the DC-DC converter further comprises an amplifier comprising:
  an input coupled to an input of the integrator circuit; and
  an output coupled to a second input of the comparator.

17. The DC-DC converter of claim 15, wherein:
the comparator is a first comparator;
the input of the flip-flop is a first input; and
the DC-DC converter further comprises a second comparator comprising an output coupled to a second input of the flip-flop.

18. The DC-DC converter of claim 17, further comprising an amplifier comprising:
an output coupled to an input of the second comparator; and
an input coupled to an input of the integrator circuit.

19. The DC-DC converter of claim 18, wherein:
the input of the amplifier is a first input; and
the DC-DC converter further comprises a sample and hold circuit comprising:
  a first input coupled to the output of the integrator circuit;
  a second input coupled to the output of the transistor driver; and
  an output coupled to a second input of the amplifier.

20. The DC-DC converter of claim 19, wherein:
the input of the second comparator is a first input;
the sample and hold circuit further comprises:
  a first switch comprising a first terminal coupled to a second input of the second comparator;
  a second switch comprising:
    a first terminal coupled to a second terminal of the first switch of the sample and hold circuit;
    a second terminal coupled to the second input of the amplifier;
  a first capacitor coupled to the first terminal of the second switch; and
  a second capacitor coupled to the second terminal of the second switch.

* * * * *